Nov. 23, 1926.  1,608,417
F. M. OTTO
BRAKE
Filed April 28, 1926    2 Sheets-Sheet 1
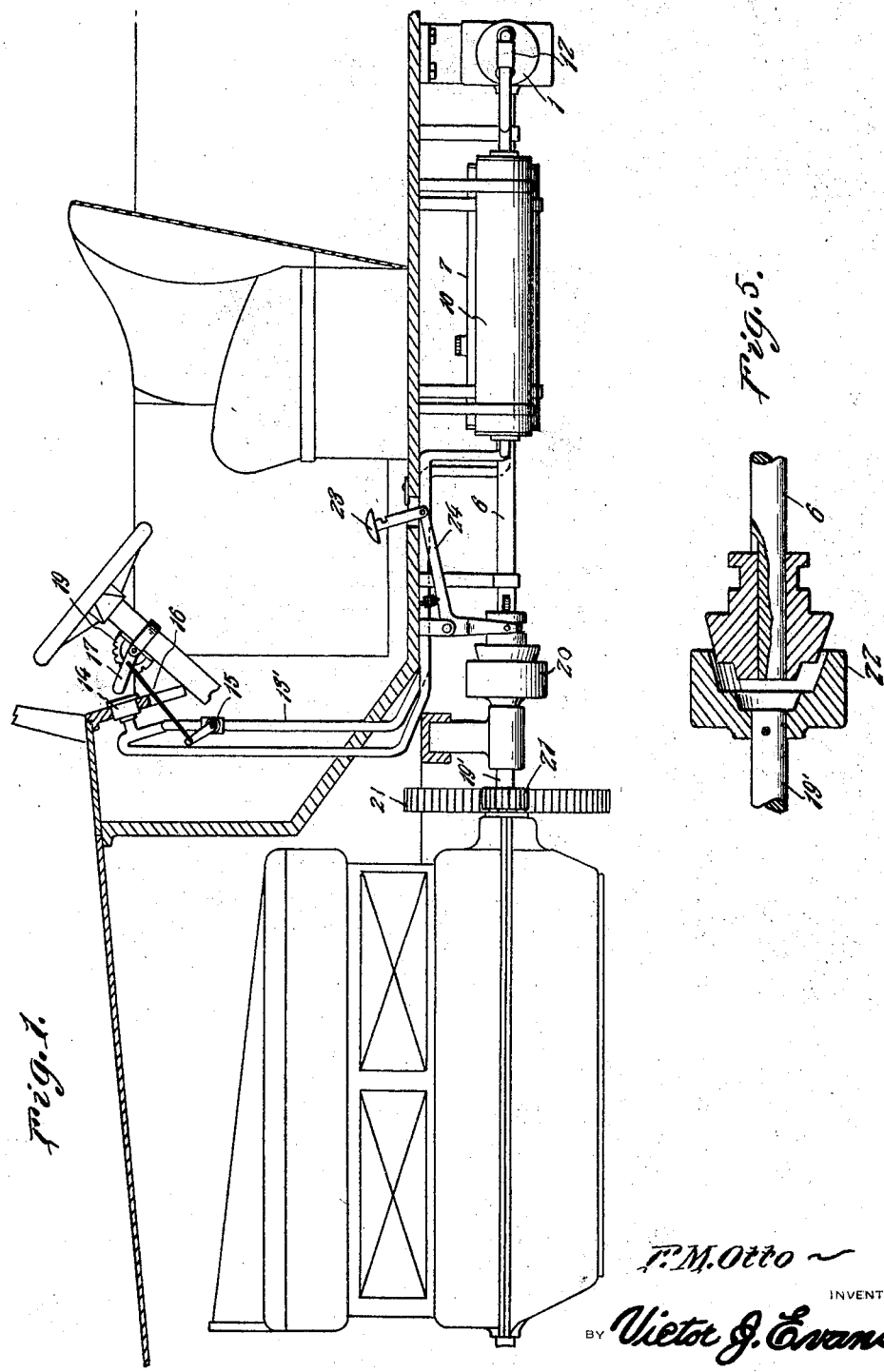

Nov. 23, 1926.
F. M. OTTO
1,608,417
BRAKE
Filed April 28, 1926　　2 Sheets-Sheet 2
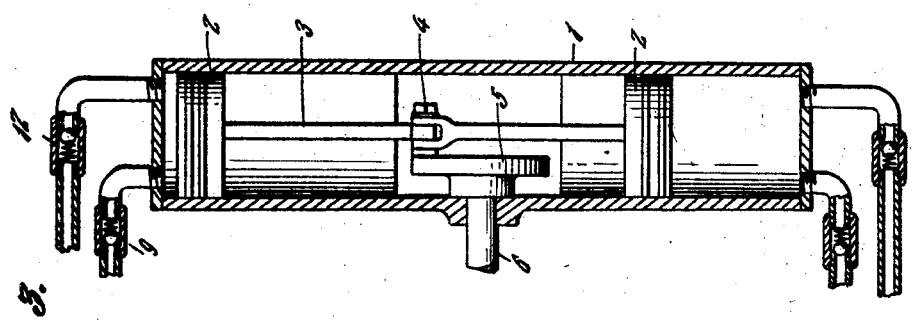
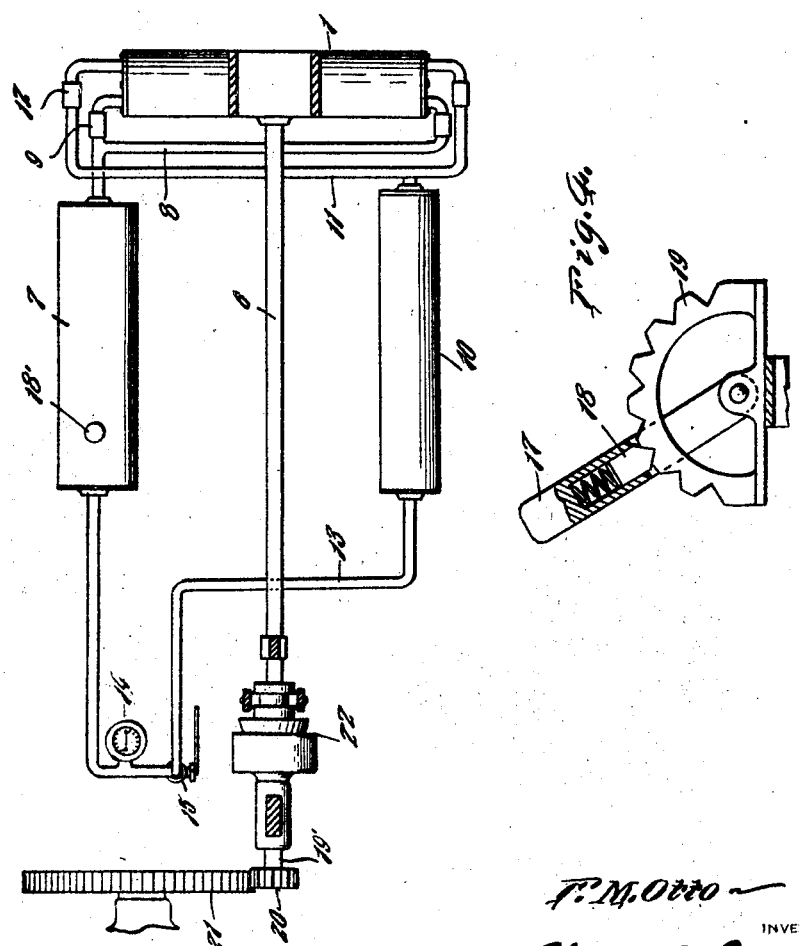

Patented Nov. 23, 1926.

1,608,417

UNITED STATES PATENT OFFICE.

FRANK M. OTTO, OF LINCOLN, NEBRASKA.

BRAKE.

Application filed April 28, 1926. Serial No. 105,219.

This invention relates to a brake for a motor vehicle or the like, the general object of the invention being to provide a liquid compressor with means for driving the same from the crank shaft of the motor of the vehicle, clutch means included in the connection and manually operated means for controlling the flow of liquid from the compressor to the storage tank so that the retarding action of the compressor on the engine can be regulated.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a sectional view through a motor vehicle showing the invention in use.

Figure 2 is a plan view of the invention.

Figure 3 is a sectional view through the compressor.

Figure 4 is a detail view of the valve operating lever.

Figure 5 is a sectional view through the clutch.

In these views, 1 indicates a compressor cylinder which is provided with two pistons 2, one at each end thereof and which have their rods 3 connected by a pin 4 with the crank disk 5 located at the center of the cylinder and which is connected with the shaft 6. A supply tank 7 is connected by the pipes 8 with both ends of the cylinder, check valves 9 being arranged in the pipes adjacent each end of the cylinder. A tank 10 is connected to both ends of the cylinder by the pipes 11 which contain the check valves 12 which are arranged adjacent the ends of the cylinder. The check valves are so arranged that on the suction stroke of each piston, liquid will be drawn from the supply tank 7, while the valve in the pipe 11 will be closed. On the compression stroke of each piston the check valve in the supply pipe will be closed, while the check valve in the other pipe will open so that the liquid previously drawn into the cylinder will be expelled into the tank 10 and the liquid in the tank 10 will pass back to the tank 7 through the pipe connection 13 which has a loop 13' therein arranged adjacent the dash of the vehicle, said loop having a gauge 14 connected therewith and a valve 15 arranged therein, the handle of the valve being connected by a link 16 to a hand lever 17 which is provided with a plunger 18 for engaging the toothed sector 19 on the steering column of the vehicle. Thus the passage of the liquid from the tank 10 to the tank 7 can be controlled by partly opening or closing the valve. The tank 7 is provided with a filling opening which is covered by the cap 18.

The shaft 19' has a pinion 20 thereon which engages the toothed fly wheel 21 of the motor and a clutch 22 is arranged between the shafts 6 and 9. A foot pedal 23, attached to a bell crank 24, is provided for shifting the movable part of the clutch.

From the foregoing, it will be seen that when the driver depresses the foot pedal, he will connect the shaft 6 with the shaft 19' so that the motor must operate the compressor so that its speed will be checked and this checking action can be increased or diminished as desired, by properly setting the valve 15 through means of the hand lever 17. Thus I have provided a simple form of compressor brake for a vehicle which may use any kind of a liquid for the compressing medium. The drawings show the tanks, pipes and compressor cylinder arranged under the floor of the body of the vehicle, but it will be understood that they may be arranged in any desired position.

It is thought from the foregoing description that the advantages and novel features of my invention will be readily apparent.

I desire it to be understod that I may make changes in the construction and in the combination and arrangement of the several parts, provided that such changes fall within the scope of the appended claims.

What I claim is:—

1. A compressor brake for a motor vehicle comprising a compressor, means for driving the same from the motor of the vehicle, manually operated means for connecting and disconnecting the motor from the compressor, a supply tank connected with the compressor, a second tank for receiving the liquid from the compressor, a connection between the two tanks and valve means for controlling the flow of liquid from one tank to the other.

2. A compressor brake for a motor vehicle comprising a double compressor, a shaft rotated by the motor, clutch means for connecting said shaft with the compressor shaft, a foot pedal for actuating the clutch means, a supply tank connected with the compressor, a second tank connected with the compressor for receiving the liquid therefrom, a pipe connecting the two tanks together, a valve in said pipe, a hand lever connected with the valve and arranged on the steering post of the vehicle, and a gauge connected with the pipe and arranged on the instrument board of the vehicle.

In testimony whereof I affix my signature.

FRANK M. OTTO.